US008716172B2

(12) United States Patent
Schermanz et al.

(10) Patent No.: US 8,716,172 B2
(45) Date of Patent: *May 6, 2014

(54) EXHAUST GAS CATALYST COMPOSITION

(75) Inventors: Karl Schermanz, Launsdorf (AT); Irene Begsteiger, Deutschlandsberg (AT); Alessandro Trovarelli, Udine (IT); Eliana Rocchini, Trieste (IT); Marzia Casanova, Ravascletto (IT)

(73) Assignee: Treibacher Industrie AG, Frauenthal (AT)

( * ) Notice: Subject to any disclaimer, the term of this patent is extended or adjusted under 35 U.S.C. 154(b) by 576 days.

This patent is subject to a terminal disclaimer.

(21) Appl. No.: 10/595,795

(22) PCT Filed: Nov. 12, 2004

(86) PCT No.: PCT/EP2004/012860
§ 371 (c)(1),
(2), (4) Date: Aug. 15, 2006

(87) PCT Pub. No.: WO2005/046864
PCT Pub. Date: May 26, 2005

(65) Prior Publication Data
US 2007/0129241 A1     Jun. 7, 2007

(30) Foreign Application Priority Data

Nov. 13, 2003 (AT) ................. A 1831/2003

(51) Int. Cl.
*B01J 23/00* (2006.01)
(52) U.S. Cl.
USPC ... 502/312; 502/350; 423/594.8; 423/594.17; 423/598
(58) Field of Classification Search
USPC ......... 502/242, 247, 248, 254, 263, 302, 305, 502/309, 312, 257, 235, 351, 354, 355, 502/350; 423/239.1, 594.8, 594.17, 598
See application file for complete search history.

(56) References Cited

U.S. PATENT DOCUMENTS

| | | | | |
|---|---|---|---|---|
| 3,513,109 A | * | 5/1970 | Stiles | 502/241 |
| 4,110,258 A | * | 8/1978 | Lauder | 502/306 |
| 4,221,768 A | * | 9/1980 | Inoue et al. | 423/239.1 |
| 4,466,947 A | | 8/1984 | Imanari et al. | |
| 4,719,192 A | * | 1/1988 | Schneider et al. | 502/84 |

(Continued)

FOREIGN PATENT DOCUMENTS

| | | |
|---|---|---|
| EP | 0787521 A1 | 8/1997 |
| GB | 1430730 | 4/1976 |

(Continued)

OTHER PUBLICATIONS

Kleemann et al., Investigation of the ammonia adsorption on monolithic SCR catalysts by transient response analysis, Mar. 23, 2000, Applied Catalysis B: Environmental, 27, 231-242.*

(Continued)

*Primary Examiner* — Kaj K Olsen
*Assistant Examiner* — Pritesh Darji
(74) *Attorney, Agent, or Firm* — Workman Nydegger

(57) ABSTRACT

Catalyst composition represented by the general formula REVO/S wherein RE is at least one of the group of rare earth metals Y, Ce, Pr, Nd, Sm, Gd, Tb, Dy, Er and Yb in an amount of up to 6.0 wt.-%; V is vanadium in an amount of 0.2-2.5 wt.-%; O is oxygen in an amount of up to 3.5 wt.-%; and S is a support containing $TiO_2$ in an amount of at least 70 wt.-%, with the rest being $WO_3$ and optionally $SiO_2$. This catalyst composition shows high removal efficiencies for $NO_x$ even after aging at 750° C.

19 Claims, 5 Drawing Sheets

Scheme of the apparatus

(56) References Cited

U.S. PATENT DOCUMENTS

| | | | |
|---|---|---|---|
| 5,300,472 A | 4/1994 | Brand et al. | |
| 7,037,463 B2 * | 5/2006 | Woodfield et al. | 419/19 |
| 2002/0141921 A1 * | 10/2002 | Wu et al. | 423/239.1 |
| 2003/0170160 A1 * | 9/2003 | Morita et al. | 423/247 |

FOREIGN PATENT DOCUMENTS

| | | |
|---|---|---|
| GB | 2149680 A | 6/1985 |
| JP | 54052691 | 4/1979 |
| JP | 11216361 | 8/1999 |

OTHER PUBLICATIONS

Reddy et al., Surface Characterization of $CeO_2/SiO_2$ and $V_2O_5/CeO_2/SiO_2$ Catalysts by Raman, EPS and Other Techniques, 2002, J.Phys. Chem, 106, 10964-10972.*

* cited by examiner

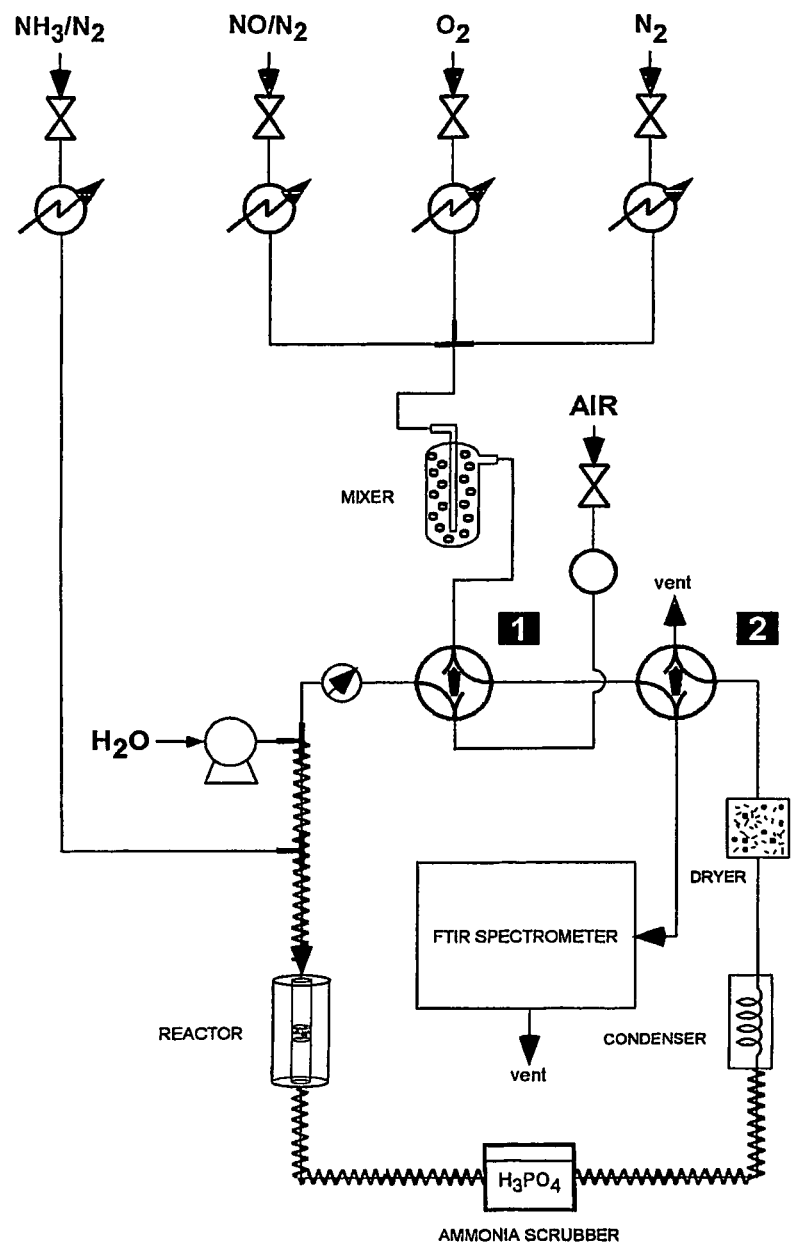
Figure 1: Scheme of the apparatus

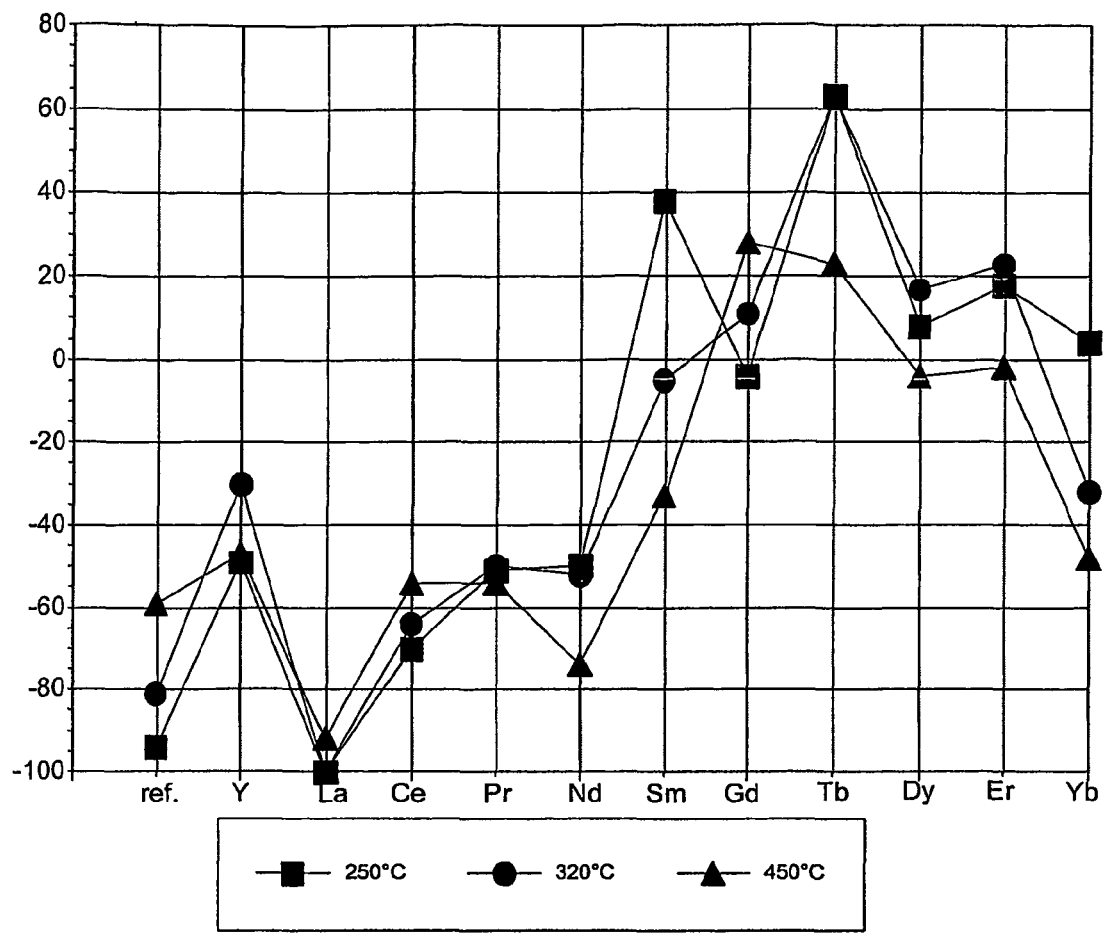
ref.: 3%$V_2O_5$/$WO_3$/$TiO_2$
Figure 2: Activity drop/increase (%) after aging for various temperatures

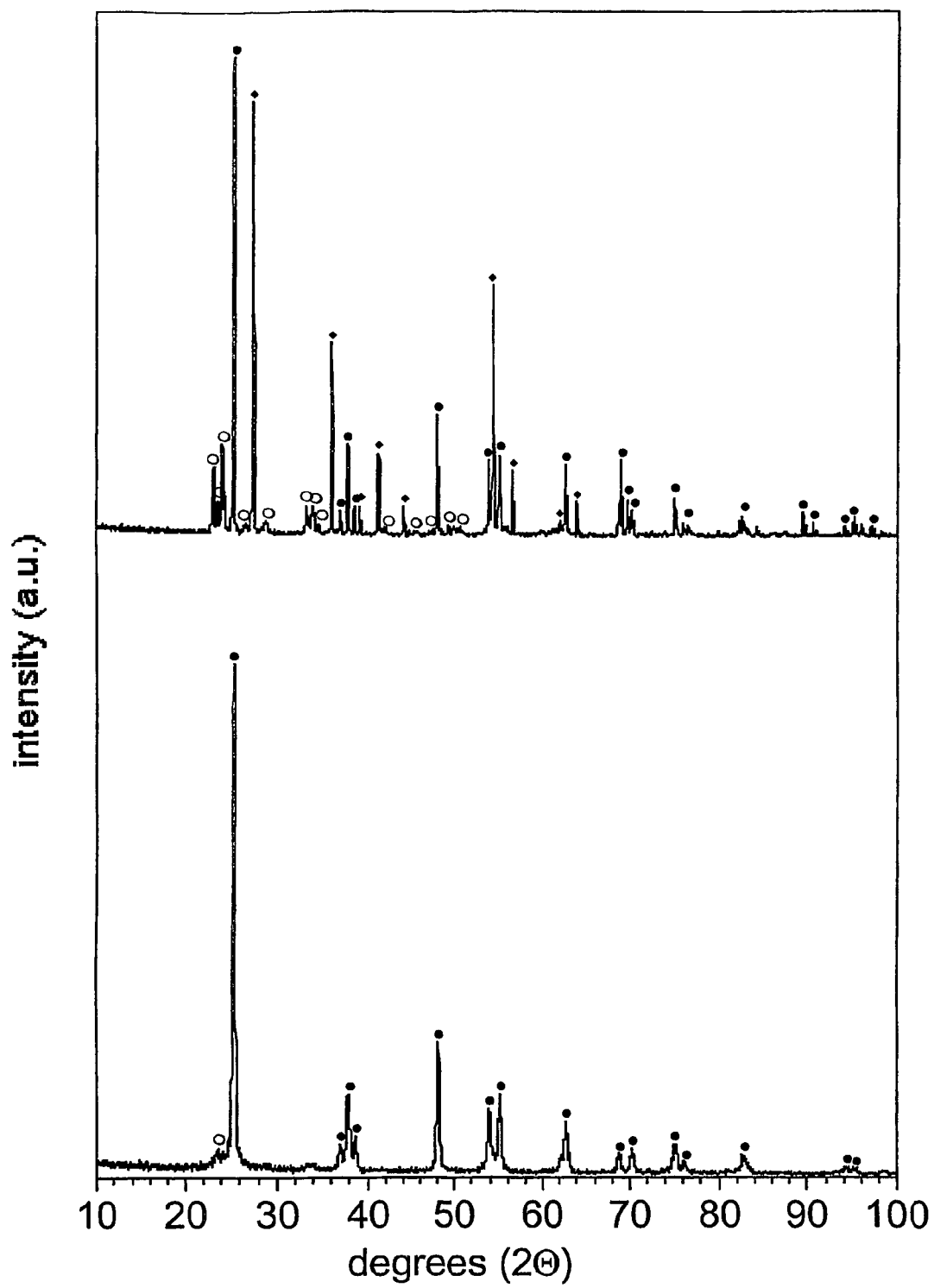
Figure 3: X-ray diffraction profiles of fresh and aged $V_2O_5$ –WT; rutile(◆); anatase(●); $WO_3$(○).

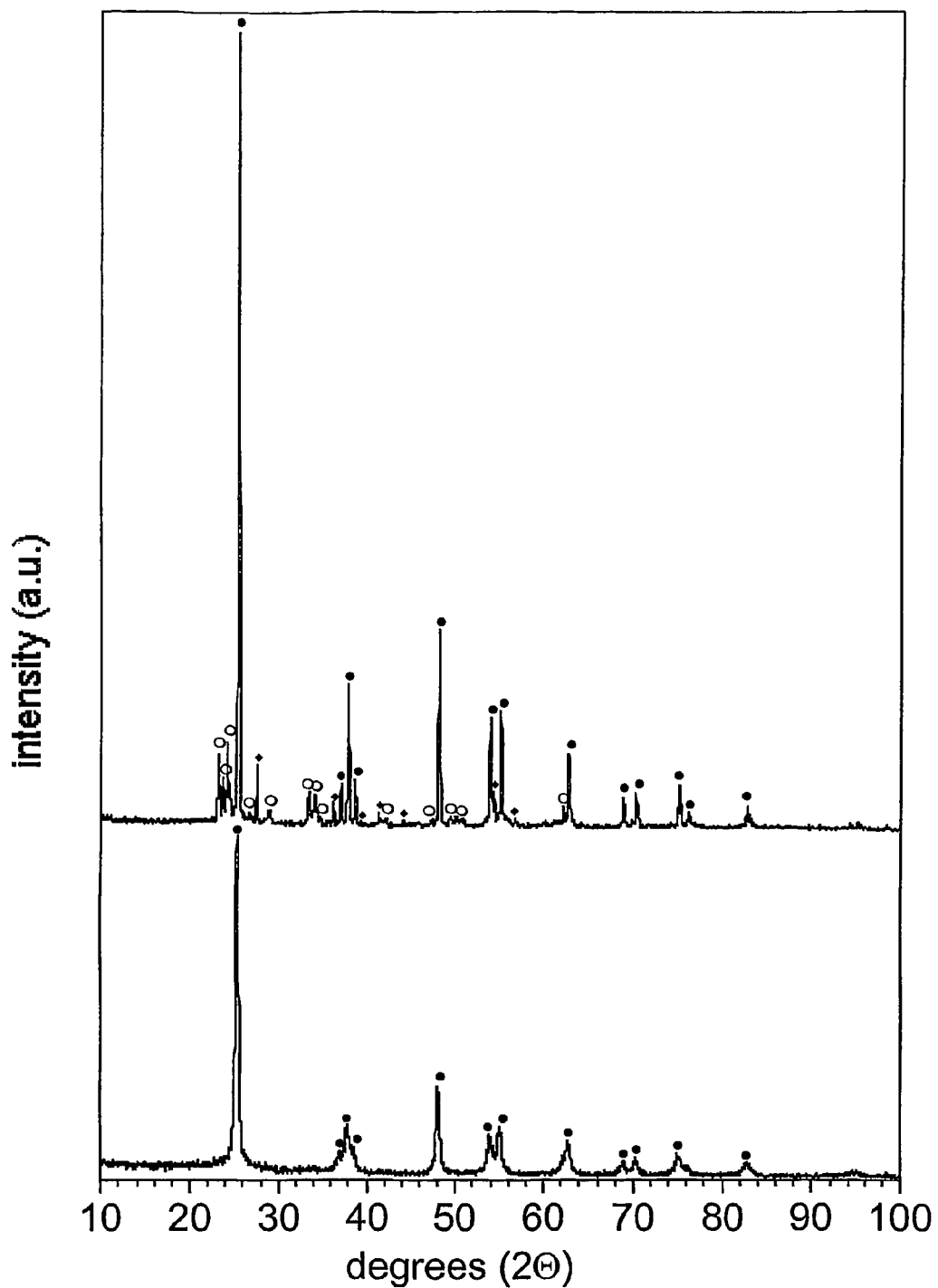
Figure 4: X-ray diffraction profiles of fresh and aged $V_2O_5$-WTS; rutile(◆); anatase(●); $WO_3$(○).

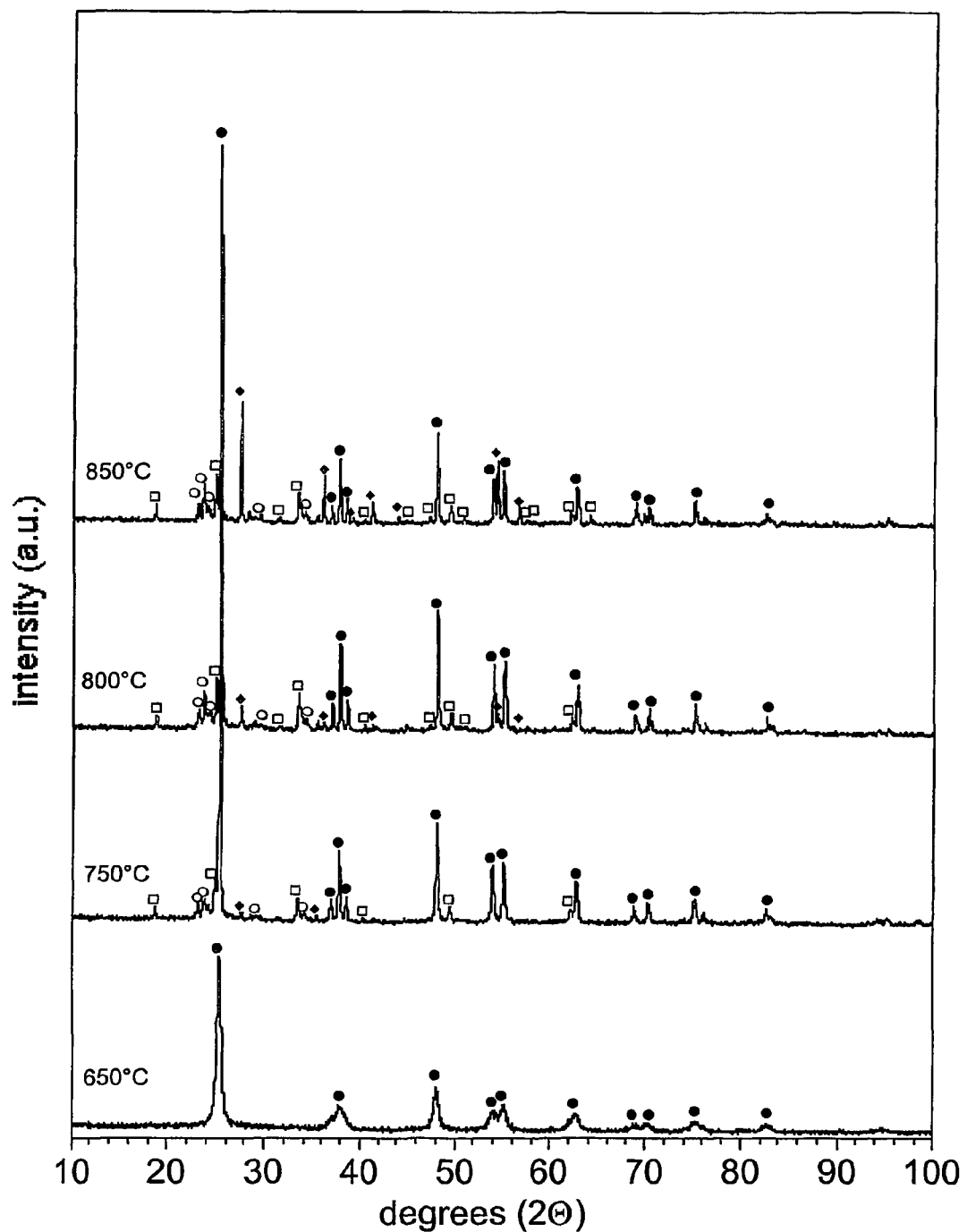
Figure 5: X-ray diffraction profiles of TbVO$_4$-WTS aged at different temperatures; rutile(◆); anatase(●);WO$_3$(○);TbVO$_4$(□).

EXHAUST GAS CATALYST COMPOSITION

BACKGROUND

The invention relates to an exhaust gas catalyst composition, in the following "catalyst composition", and a process for its preparation.

The reduction of nitrogen oxide emissions represents one of the greatest challenges in environmental protection. Several approaches have been followed to reduce $NO_x$ emissions for both mobile and stationary applications including combustion modification methods and denitrification of flue gases. The former, although $NO_x$ removal efficiency varies with the technology applied, cannot achieve more than 50-60% of removal efficiency. After-treatment of flue gases can achieve substantially larger efficiencies especially when a catalytic method is employed. Several type of catalysts have been tested which are active under different environments and conditions. The use of a large number of catalysts to eliminate NO is associated with different reaction pathways that can be divided as follows (1):

1. The selective catalytic reduction of NO with ammonia (herein after referred to as SCR), for stationary applications like power stations and chemical industrial plants.
2. The catalytic reduction of NO in the presence of CO, typical of automotive pollution control.
3. The catalytic reduction of NO in the presence of hydrocarbons, a method not in use commercially but potentially interesting for automotive and industrial pollution control.
4. The direct elimination of NO through decomposition for which a durable and stable catalysts has not yet been developed.
5. The sorbing of NO or $NO_x$-trap catalysts.

Among these methods the most widely employed technology for stationary applications is SCR (2-4). It was introduced in the late 1970s for the control of $NO_x$ emissions in stack gases for thermal power plants and other industrial facilities. SCR plants are currently operating in USA, Japan, Europe and Far East for a total capacity of the order of 180000 MW. The SCR is based on the reduction of $NO_x$ with $NH_3$ into water and nitrogen according to the reaction:

$$4NO+4NH_3+O_2=4N_2+.6H_2O$$

The technology is operated commercially over metal-oxide SCR catalysts made of a homogeneous mixture of $TiO_2$ (80-90 wt.-%), $WO_3$ (6-10 wt.-%) and $V_2O_5$ (up to 3 wt.-%) which may contain some $SiO_2$ (0-10 wt.-%) in the formulation. Titania is used as an active support of high surface area to support the active component $V_2O_5$ which is responsible for the activity of catalysts for $NO_x$ reduction at low and medium operation temperatures. It is also responsible for the oxidation of $SO_2$ to $SO_3$ when $SO_2$ containing gases are delivered to the catalyst. Therefore, for high-sulfur content off-gases, its amount is kept low (below 1 wt.-%). $WO_3$ (sometime also $MoO_3$) is employed as a chemical/structural promoter to enlarge the temperature window of application. Silica is often used to improve the catalyst strength and stability. Commercial catalysts are employed as honeycomb monoliths due to several advantages over a packed bed arrangement: lower pressure drop, higher attrition resistance, less plugging by fly ash.

GB 1 495 396 describes a catalyst composition containing as active ingredients oxides from titanium, at least one of molybdenum, tungsten, iron, vanadium, nickel, cobalt, copper, chromium and uranium, and as optional component(s) tin and/or at least one of silver, beryllium, magnesium, zinc, boron, aluminium, yttrium, rare earth metal, silicon, niobium, antimony, bismuth, manganese, thorium and zirconium, which oxides are present as an intimate mixture.

EP 1 145 762 A1 describes a process for the preparation of a vanadia SCR-catalyst supported on titania. The process is characterized in that the catalyst is prepared by dispersing titania in an ammonium metavanadate solution, adjusting the pH of the solution to a value of 7.0-7.1, stirring the resulting suspension for a time for complete adsorption of the vanadium compound on titania, filtering the suspension and drying and calcining the resulting catalyst compound.

In spite of the fact that SCR technology is used worldwide there are still opportunities to improve catalytic performance especially in relation to the following issues: (i) to improve catalyst design in order to obtain at the same time a higher activity in $NO_x$ removal and a lower activity in $SO_2$ oxidation; (ii) to limit ammonia slip and to improve the behaviour of the system under dynamic conditions; (iii) to extend the present applicable temperature range of SCR catalysts towards higher temperature up to 600° C. and to avoid deactivation which occurs at present catalysts when operated at high temperatures. It is in fact known that the activity of a $V_2O_5/TiO_2/SiO_2$ catalyst increases markedly with a rise in calcinations temperature up to 600-650° C. and then rapidly decreases. This is mainly due to phase transformation of $TiO_2$ (anatase) into $TiO_2$ (rutile) and consequent loss of BET surface area with changes in the chemical state of surface vanadium species. Solving these issues will pave the road for use of SCR also in mobile applications; the process using urea as reducing agent is in fact investigated intensively for use in diesel or gasoline lean-burn engines (5-6). The challenges for automotive applications are high SCR activity and improved thermal stability of vanadia-tungsta-titania catalysts in the temperature range 423-1 000 K. Such extreme operating temperatures (compared to "classic" SCR applications where temperature range of the order of 573-773 K are often encountered) are certainly of short duration and may occur at very high power output (low rpm and high load).

SUMMARY

The present invention is aimed to solve the problem related to improvement of thermal stability at higher temperatures where state of the art V/Ti/W/Si and V/Ti/W catalysts still suffer strong deactivation.

The catalyst composition according to the invention is represented by the general formula

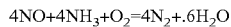

wherein
RE is at least one of the group of rare earth metals Y, Ce, Pr, Nd, Sm, Gd, Tb, Dy, Er and Yb in an amount of up to 6.0 wt.-%;
V is vanadium in an amount of 0.2-2.5 wt.-%;
O is oxygen in an amount of up to 3.5 wt.-%; and
S is a support containing $TiO_2$ in an amount of at least 70 wt.-%,
with the rest being $WO_3$ and optionally $SiO_2$.

The invention is based on the observation that promotion of V/Ti/W/Si and V/Ti/W catalysts with rare earth (RE) strongly improves activity even after aging at temperatures of 750° C. for several hours, when the activity of state of the art catalysts drops to negligible values. This allows potential application of these catalysts in the removal of $NO_x$ from diesel or gasoline lean-burn automotive engines in addition to stationary applications at high temperatures.

In a preferred embodiment RE is at least one of the group of Pr, Sm, Gd, Tb, Dy and Er, and particularly one of the group of Sm, Gd, Tb, Dy and Er, and more preferred at least one of Er and Tb.

Also preferred is that the support S of the catalyst composition contains $SiO_2$ in an amount of 4-12 wt.-%, particularly in an amount of 5-10 wt.-%.

The invention is also directed to a first process (process I) for the preparation of a catalyst composition, characterized in that a solid support containing $TiO_2$ in an amount of at least 70 wt.-%, $WO_3$ in an amount of 5-20 wt.-%, and optionally $SiO_2$ in an amount of up to 15 wt.-%, is contacted with an aqueous solution containing an vanadium salt and a salt of at least one rare earth metal selected from the group of Y, Ce, Pr, Nd, Sm, Gd, Tb, Dy, Er and Yb to give a slurry which is brought to dryness and calcined. By bringing the solid support in contact with the solution of the rare earth salt, adsorption on the support takes place.

A second process (process II) for the preparation of a catalyst composition is characterized in that a solid support containing $TiO_2$ in an amount of at least 70 wt.-%, $WO_3$ in an amount of 5-20 wt.-%, and optionally $SiO_2$ in an amount of up to 15 wt.-%, is contacted with a vanadium salt and a hydroxide of at least one rare earth metal selected from the group of Y, Ce, Pr, Nd, Sm, Gd, Tb, Dy, Er and Yb to give a slurry which is brought to dryness and calcined. By bringing the solid support in contact with the hydroxide of the rare earth, adsorption on the support takes place.

A third process (process III) for the preparation of a catalyst composition is characterized in that a solid support containing $TiO_2$ in an amount of at least 70 wt.-%, $WO_3$ in an amount of 5-20 wt.-%, and optionally $SiO_2$ in an amount of up to 15 wt.-%, is contacted with a vanadate (REVO4) of at least one rare earth metal selected from the group of Y, Ce, Pr, Nd, Sm, Gd, Tb, Dy, Er and Yb to give a slurry which is brought to dryness and calcined. By bringing the solid support in contact with the rare earth vanadate, adsorption on the support takes place.

In a more preferred embodiment the rare earth metal is at least one of the group of Pr, Sm, Gd, Tb, Dy and Er, and particularly one of the group of Sm, Gd, Tb, Dy and Er, and more preferred at least one of Er and Tb.

The invention is also directed to a catalyst composition which is obtainable according to the inventive processes mentioned above.

The invention is also directed to a catalyst composition which is obtainable according to the inventive processes mentioned above, containing
said rare earth metal in an amount of up to 6.0 wt.-%;
vanadium in an amount of up to 2.5 wt.-%;
oxygen in an amount of up to 3.5 wt.-%;
$TiO_2$ in an amount of at least 65 wt.-%,
$WO_3$ in an amount of up to 20 wt.-%,
and optionally $SiO_2$ in an amount of up to 15 wt.-%.

BRIEF DESCRIPTION OF THE DRAWINGS

FIG. 1 illustrates the apparatus used in catalyst testing.

FIG. 2 illustrates the overall picture of activity drop/improvement after aging and a dependence of activity on position of the element in the periodic table.

FIGS. 3 and 4 show respectively X-ray diffraction profiles of fresh and aged $V_2O_5$/WT and $V_2O_5$/WTS.

FIG. 5 shows the effect of aging treatment at temperatures in the range 650-850° C. for Tb—V—O/WTS.

DETAILED DESCRIPTION

In the following preferred embodiments of the invention are described in more detail.

The catalysts according to the invention were obtained starting from two support materials of composition 81% $TiO_2$-9% $WO_3$-10% $SiO_2$ (Ti/W/Si) and 90% $TiO_2$-10% $WO_3$ (Ti/W). To this support, a combination of V and RE elements were added to provide a $NO_x$ reduction catalysts represented by the formula REVO/Ti—W—Si with RE=Y, Ce, Pr, Nd, Sm, Gd, Tb, Dy, Er and Yb. The content of the active phase was in the range up to 5.1 wt.-% RE element, 0.4-2.1 wt.-% vanadium and up to 2.7 wt.-% oxygen, corresponding to a REVO loading in the range of 2.5-8.5 wt.-%

1. Preparation of a Catalyst According to the Invention Containing 5.0 wt.-% Er and 1.5 wt.-% V on a Ti—W—Si Support 1.1. Preparation of the Ti—W—Si Support Preparation of the support was carried out according to (7): 92.68 g of titanium tetrachloride ($TiCl_4$) was added dropwise to 1 liter of water under ice cooling with stirring. Then 16.06 g of Lithosol 1530 KD (a tradename for a product of Zschimmer & Schwarz Chemische Fabriken, containing 30% of $SiO_2$ in the sol state) were added. While thoroughly stirring the mixture at about 30° C., ammonia water was gradually added. When the pH of the mixture reached 7, the addition was stopped. The mixture was aged by allowing it to stand for 2 hours. The resulting $TiO_2$—$SiO_2$ gel was filtered, washed with water, dried at 120° C. for 10 hours and further washed with water, then calcined at 500° C. for 3 hours. The resulting $TiO_2$—$SiO_2$ powder contained 86 mole % of titanium and 14 mole % of silicon as $SiO_2$. The resulting powder was designated as (Ti/Si).

A solution of 8.16 g of ammonium paratungstate $[(NH_4)_{10}W_{12}O_{41} \cdot 5H_2O]$ in 500 ml of distilled water was added to 73.4 g of (Ti/Si). They were thoroughly mixed with stirring, concentrated, dried and calcined at 500° C. for 6 hours. The resulting support had a weight % ratio $TiO_2$:$WO_3$:$SiO_2$ of 81:9:10.

1.2. Preparation of the Catalyst According to the Invention

An aliquot of 69.7 mg of ammonium metavanadate was dissolved in 10 ml of 1N oxalic acid. The solution was heated in order to obtain the blue complex $(NH_4)_2[VO(C_2O_4)_2]$ and then 2478.2 mg of erbium acetate solution (4.6% of Er) were added under mixing. Moreover, some drops of $HNO_3$ were added in order to avoid the precipitation of the erbium oxalate. Then, the support (1831.8 mg of mixed oxide containing 81% $TiO_2$-9% $WO_3$-1 0% $SiO_2$) was added. This slurry was brought to dryness under continuous stirring at 80-100° C. Finally, the solid was dried at 120° C. overnight and calcined at 650° C. for 2 hours, pressed into pellet, crushed and sieved in the range 355-425 μm. This will be referred as fresh sample.

Aging of samples was carried out in a tubular furnace at a temperature of 750° C. for 10 hours under air.

1.3. Preparation of the Catalyst According to Process II of the Invention 1.3.1. Preparation of the Erbiumhydroxide $(Er(OH)_3)$ Erbitunbydroxide was prepared by dissolving 3.82 g of $Er_2O_3$ in approx. 35 ml of $HNO_3$/water (1:1) mixture under stirring. As soon as the solution of Er-Nitrate was formed, conc. Ammonia solution was added until precipitation of Er-Hydroxide was completed. The precipitate was separated by filtration, washed several times with distilled water and dried at moderate temperatures (approx. 60° C.) to produce a wet cake of Er-Hydroxide having an Er content of 19.6%.

1.3.2. Preparation of the Catalyst 104. 5 mg of monoethanolamine and 3659 mg of distilled water were mixed. The solution was heated up to 90° C. and 104.54 mg of $NH_4VO_3$ added under stirring. To the solution there were added 759.9 mg $Er(OH)_3$ (Er content being 19.6%)

followed by adding of 2747.7 mg of the Ti/W/Si support (containing 81% $TiO_2$-9% $WO_3$-10% $SiO_2$). This slurry was brought to dryness under continuous stirring at 80-100° C. Finally, the solid was dried at 120° C. overnight and calcined at 650° C. for 2 hours, pressed into pellet, crushed and sieved in the range 355-425 μm. This will be referred as fresh sample.

Aging of samples was carried out in a tubular furnace at a temperature of 750° C. for 10 hours under air.

1.4. Preparation of the Catalyst According to Process III of the Invention 1.4.1. Preparation of the Erbiumvanadate ($ErVO_4$)

The crystalline $ErVO_4$ is prepared by the liquid—phase reaction method.

1.032 g of $NH_4VO_3$ are dissolved in distilled water at 80° C. in order to obtain a 0.1 mol/l solution; at the same time an Erbium Nitrate Solution (0.2 mol/l) is prepared by diluting 6.695 g of $Er(NO_3)_3$ solution (containing 22.16% of Er) with distilled water at 80° C.

After mixing the two solutions under continuous stirring the pH was adjusted to 7.0 with the help of ammonia (30% solution). This causes the precipitation of a white-pale pink compound ($EbVO_4$) that was filtered, washed several times with distilled water and dried at 100° C. overnight.

1.4.2. Preparation of the Catalyst

Two slurries were formed dissolving 252.3 mg of $ErVO_4$ and 2747.7 mg of the Ti/W/Si support ($WO_3/TiO_2$-(10%) $SiO_2$) in distilled water. The two slurries were mixed heating up to 90° C. and stirring. The final slurry was brought to dryness under continuous stirring at 80-100° C. Finally, the solid was dried at 120° C. overnight and calcined at 650° C. for 2 hours, pressed into pellet, crushed and sieved in the range 355-425 μm. This will be referred as fresh sample.

Aging of samples was carried out in a tubular furnace at a temperature of 750° C. for 10 hours under air.

2. Preparation of a State of the Art Catalyst 1.7% V/Ti/W (8)

2.1. Preparation of the Ti—W Support

The preparation of the support was carried out according to (9): 87 g of titanium tetrachloride ($TiCl_4$) were poured into 300 ml of ice water and the solution was neutralized with 3N ammonia water. The resulting precipitate was separated by filtration, and thoroughly washed with distilled water. A solution of 4.58 g of ammonium paratungstate $[(NH_4)_{10}W_{12}O_{41}.5H_2O]$ in 325 ml of distilled water was thoroughly mixed with the resulting cake. The resulting slurry was dried, and calcined at 500° C. for 6 hours in a muffle furnace. The resulting support had a weight % ratio $TiO_2:WO_3$ of 90:10.

2.2. Preparation of the Catalyst 1.7% V/Ti/W

An aliquot of 77.2 mg of ammonium metavanadate was dissolved in 10 ml of 1N oxalic acid. The solution was heated in order to obtain the blue complex $(NH_4)_2[VO(C_2O_4)_2]$. Then, the support (1940 mg of mixed oxide containing 90% $TiO_2$-10% $WO_3$) was added. This slurry was brought to dryness under continuous stirring at 80-100° C. Finally, the solid was dried at 120° C. overnight and calcined at 650° C. for 2 hours, pressed into pellet, crushed and sieved in the range 355-425 μm.

The specific surface areas of oxide powders were measured by the BET method using $N_2$ adsorption/desorption at 77K with a Sorptomatic 1990 instrument (Carlo Erba).

3. Catalyst Testing

Catalyst testing was carried out in the apparatus described in FIG. 1. The gas feed consisted of $NH_3/N_2$, $NO/N_2$, $O_2$, $N_2$. Mass flow meters were used to measure and control the single gaseous stream while an injection pump was used to introduce water. The feed stream was preheated and premixed and ammonia was added to the gaseous mixture immediately before entering the reactor to avoid side reactions. A tubular quartz reactor was employed inserted in a furnace. Temperature was controlled by a thermocouple inserted in the catalyst bed. The gas exiting the reactor was scrubbed with an aqueous solution of phosphoric acid to trap unconverted ammonia and then cooled to condense water vapor. Activity of the catalysts were measured under stationary conditions in a temperature range of 250° C. to 450° C. Unless otherwise reported the standard gas composition and reaction conditions given in Table 1 were used. Conditions were selected in order to have a conversion not exceeding ca. 90% with reference catalyst. Gas composition analysis was carried out with an FTIR spectrometer equipped with a gas cell.

Table 2 shows NOx removal efficiency in the temperature range 250-450° C. for catalysts prepared according to process I containing 0.4-2.1 wt. % V and 1.4-5.1 wt. % RE on Ti/W/Si support. For comparison the activity of the state of the art reference catalyst based on 1.7 wt. % V/Ti/W are also reported.

The $NO_x$ reduction activity of all the catalysts examined in the present study increased with increasing reaction temperature up to about 320° C. where a maximum $NO_x$ reduction activity was observed. At this point the activity began to decrease due to lower ammonia adsorption capacity. A strong effect is also shown with aging (calcination at 750° C. for 10 h). Particularly for the state of the art catalyst calcined at a temperature of 750° C. strong deactivation is observed with conversion dropping at values between 5-20%. A similar strong deactivation is observed also with La-containing catalyst. All the other catalysts can be broadly divided in two groups: group A catalysts (comprising Y, Ce, Pr and Nd) which suffer a slight deactivation after aging and group B catalysts (comprising Sm, Gd, Th, Dy, Er, —Yb is in the middle of the two groups—) in which deactivation has no effect or even causes an improvement of overall efficiency. The best performances are observed with Er and Tb containing catalysts where a substantial increase of conversion is observed after aging in all temperature range examined.

The overall picture detailing activity drop/improvement after aging is shown in FIG. 2, which also highlights a dependence of activity on position of the element in the periodic table.

Table 2 shows also the $NO_x$ removal efficiency against RE and V loading. The loading amount was controlled by varying the amount of ammonium vanadate and rare earth acetate solutions in the impregnation. The preparation of a 0.4 wt. % V and 1.5 wt. % Er on Ti/W/Si is reported below.

The support was prepared as already described. The supported catalysts were prepared according to the following procedure: 19 mg of ammonium metavanadate were dissolved in 10 ml of oxalic acid 1N. The solution was heated in order to obtain the blue complex $(NH_4)_2[VO(C_2O_4)_2]$ and then 619.6 mg of erbium acetate solution (4.6% of Er) were added. Moreover, some drops of $HNO_3$ were added in order to avoid the precipitation of the erbium oxalate. Then, the support (1831.8 mg of Ti/W/Si) was added. This slurry was brought to dryness under continuous stirring at 80-100° C. Finally, the solid was dried at 120° C. overnight and calcined at 650° C. for 2 hours, pressed into pellet, crushed and sieved in the range 355-425 μm].

Table 2a shows NOx removal efficiency in the temperature range 250-450° C. for catalysts prepared according to process II containing 0.4-2.1 wt. % V and 1.4-5.1 wt. % RE on Ti/W/Si support. For comparison the activity of the state of the art reference catalyst based on 1,7 wt. % V/Ti/W are also reported.

Table 2b shows NOx removal efficiency in the temperature range 250-450° C. for catalysts prepared according to process III containing 0.4-2.1 wt. % V and 1.4-5.1 wt. % RE on Ti/W/Si support. For comparison the activity of the state of the art reference catalyst based on 1,7 wt. % V/Ti/W are also reported.

As listed in table 2 (examples 8-10, 12-13) loading does not affect strongly activity after aging. For all the sample investigated an unusual promotion of activity is observed after aging at 750° C. Catalysts in the fresh state are less active at the lowest loading, (especially at the lowest temperatures) consistently with the presence of a lower amount of active phase containing vanadium. Maximum of activity is observed always at 320° C.

Surface area analysis is reported in Table 4 and 5. With all the catalysts examined aging procedure causes a drop in surface area which is proportional to the amount of RE and V deposited. This would suggest that aging induce an interaction between the active phase containing rare earths and the support.

X-ray diffraction analysis of the supports showed that $TiO_2$ (anatase) is the only phase detected after aging at 750° C. under air for 10 h, indicating that transformation to rutile does not occur. The presence of silica has no effect on X-ray diffraction profile under these conditions. Aging under more severe conditions (850° C., 10 h) induces a modification of diffraction profile of both supports. Segregation of crystalline $WO_3$ is observed in both samples while for supports not containing silica, $TiO_2$ in the form of rutile is clearly evidenced. The introduction of $SiO_2$ strongly stabilizes anatase against its transformation to rutile. The introduction of vanadium modifies this picture by accelerating segregation of $WO_3$-containing phases and transformation of anatase to rutile.

FIGS. 3 and 4 show respectively X-ray diffraction profiles of fresh and aged $V_2O_5$/WT and $V_2O_5$/WTS. Peaks characteristic of $V_2O_5$ are not seen in both supports indicating that $V_2O_5$ is either amorphous when supported on $TiO_2$ or that the particle size is below the detection limits of X-ray technique. This is in agreement with the fact that crystalline $V_2O_5$ on $TiO_2$ is observed only at higher loading (10). In the presence of $V_2O_5$ the anatase to rutile phase transformation is initiated at lower temperature, as a consequence for WT support after calcinations at 750 for 10 h approx 50% of $TiO_2$ is in the form of rutile. The presence of $V_2O_5$ also accelerates segregation of crystalline $WO_3$ phase, in accordance with previous observations (10-11).

A more accurate analysis of X-ray diffraction profiles indicate that modification of $WO_3$ by introduction of foreign cations into the oxide lattice could be responsible of small differences in the peak positions. Formation of mixed $Ti_xW_yO_3$ or $M_xW_yO_3$ (with M being an impurity present in the support) could be a possibility although no evidence can be found from existing XRD patterns. The presence of residual Ca from commercial additives was responsible of formation of $CaWO_4$ in structured catalysts of similar composition treated at comparable temperatures (11). Reaction of supported vanadia with $TiO_2$ to yield $V_xTi_{1-x}O_2$ in which vanadium is incorporated into the titania support in the form of rutile has been previously observed. In our case, lattice parameters of $TiO_2$ (rutile) stabilized in the presence and in the absence of vanadia are coincident, indicating that formation of TiVO solid solution does not occur. $SiO_2$-containing support shows a similar behavior although the transformation of $TiO_2$ (anatase) to rutile is slower, in agreement with what observed in the absence of $V_2O_5$.

Table 6 summarizes XRD data on RE containing catalysts prepared according to process I treated at two different aging temperatures. The diffraction profiles after aging at 650° C. reveals the presence of weak signals due to formation of rare earth vanadates. These can be seen from the majority of RE elements investigated. Calcinations at 750° C. clearly evidence formation of crystalline $REVO_4$ for all elements with the exception of La. Interestingly, the presence of lanthanides seems to positively influence the degree of rutilization of the support and the process of segregation/formation of $WO_3$. For silica containing support rutile is seen only at calcinations temperatures above 750° C. and the appearance of crystalline $WO_3$ is also retarded (this is true except for Tb, Ce and Pr-containing catalysts where the formation of $WO_3$ is not affected if compared with $V_2O_5$-only samples). In the absence of silica, segregation of $WO_3$ and transformation to rutile occur already at temperature of 750° C., although the presence of RE slow down their formation. FIG. 5 shows the effect of aging treatment at temperatures in the range 650-850° C. for Tb—V—O/WTS.

TABLE 1

Reaction conditions and gas composition

| | |
|---|---|
| Catalyst weight | 100.0 mg |
| Particle size | 350-425 μm |
| Total flow | 0.3 l/min |
| Temperature | 250-450° C. |
| NO conc. | 200 ppm |
| $NH_3$ conc. | 240 ppm |
| $O_2$ conc. | 20000 ppm |
| $H_2O$ conc. | 10% |
| $N_2$ conc. | balance |

TABLE 2

Activity of fresh and aged catalysts containing RE and V on TiO2:WO3:SiO2 (81:9:10) matrix

| | | | | NO conversion in % | | | | | |
|---|---|---|---|---|---|---|---|---|---|
| Example Nr | RE | RE [%] | V [%] | 250° C. fresh | 250° C. aged | 320° C. fresh | 320° C. aged | 450° C. fresh | 450° C. aged |
| 1 | Y | 3.7 | 2.1 | 49 | 25 | 70 | 49 | 55 | 29 |
| 2 | La | 4.6 | 1.7 | 31 | 0 | 51 | 0 | 38 | 3 |
| 3 | Ce | 4.6 | 1.7 | 67 | 20 | 86 | 31 | 46 | 21 |
| 4 | Pr | 4.6 | 1.7 | 51 | 25 | 74 | 37 | 35 | 16 |
| 5 | Nd | 4.7 | 1.7 | 40 | 20 | 62 | 30 | 43 | 11 |
| 6 | Sm | 4.8 | 1.6 | 40 | 55 | 64 | 61 | 43 | 29 |
| 7 | Gd | 4.9 | 1.6 | 50 | 48 | 61 | 68 | 47 | 60 |
| 8 | Tb | 1.4 | 0.5 | 22 | 68 | 53 | 90 | 50 | 65 |
| 9 | Tb | 2.8 | 0.9 | 40 | 63 | 68 | 81 | 51 | 45 |

TABLE 2-continued

Activity of fresh and aged catalysts containing
RE and V on TiO2:WO3:SiO2 (81:9:10) matrix

| Example Nr | RE | RE [%] | V [%] | 250° C. fresh | 250° C. aged | 320° C. fresh | 320° C. aged | 450° C. fresh | 450° C. aged |
|---|---|---|---|---|---|---|---|---|---|
| 10 | Tb | 4.9 | 1.6 | 32 | 52 | 49 | 80 | 40 | 49 |
| 11 | Dy | 4.9 | 1.5 | 48 | 52 | 64 | 75 | 50 | 48 |
| 12 | Er | 1.5 | 0.4 | 24 | 46 | 52 | 71 | 49 | 47 |
| 13 | Er | 5 | 1.5 | 40 | 47 | 65 | 80 | 54 | 53 |
| 14 | Yb | 5.1 | 1.5 | 45 | 47 | 72 | 49 | 48 | 25 |
| (Reference) | — | — | 1.7 | 85 | 5 | 91 | 17 | 17 | 7 |

TABLE 2a

Activity of fresh and aged catalysts prepared according to process
II containing RE and V on TiO$_2$:WO$_3$:SiO$_2$ (81:9:10) matrix

| Example Nr | RE | RE [%] | V [%] | 250° C. fresh | 250° C. aged | 320° C. fresh | 320° C. aged | 450° C. fresh | 450° C. aged |
|---|---|---|---|---|---|---|---|---|---|
| 15 | Tb | 4.9 | 1.6 | 61 | 64 | 87 | 82 | 63 | 11 |
| 16 | Er | 5 | 1.5 | 92 | 57 | 97 | 83 | 48 | 11 |
| (Reference) | — | — | 1.7 | 85 | 5 | 91 | 17 | 17 | 7 |

Table 2b Activity of fresh and aged catalysts prepared according to
process III containing RE and V on TiO$_2$:WO$_3$:SiO$_2$ (81:9:10) matrix

| Example Nr | RE | RE [%] | V [%] | 250° C. fresh | 250° C. aged | 320° C. fresh | 320° C. aged | 450° C. fresh | 450° C. aged |
|---|---|---|---|---|---|---|---|---|---|
| 17 | Tb | 4.9 | 1.6 | 31 | 50 | 53 | 77 | 36 | 33 |
| 18 | Er | 5 | 1.5 | 33 | 73 | 75 | 91 | 64 | 46 |
| (Reference) | — | — | 1.7 | 85 | 5 | 91 | 17 | 17 | 7 |

TABLE 3

Activity of fresh and aged catalysts prepared according to
process I containing RE and V on TiO2:WO3 (90:10) matrix

| Example Nr | RE | RE [%] | V [%] | 250° C. fresh | 250° C. aged | 320° C. fresh | 320° C. aged | 450° C. fresh | 450° C. aged |
|---|---|---|---|---|---|---|---|---|---|
| 17 | Er | 5 | 1.5 | 58 | 17 | 81 | 46 | 46 | 9 |
| 18 | Tb | 4.9 | 1.6 | 62 | 25 | 88 | 48 | 48 | 29 |
| 19 | Pr | 4.6 | 1.6 | 64 | 23 | 80 | 40 | 40 | 17 |
| 20 | Ce | 4.6 | 1.7 | 83 | 3 | 94 | 27 | 27 | 6 |
| (Reference) | — | — | 1.7 | 85 | 5 | 91 | 13 | 36 | 10 |

TABLE 4

Surface area of fresh and aged catalysts prepared according to
process I containing RE and V on TiO2:WO3:SiO2 (81:9:10) matrix

| Example Nr. | RE | RE [%] | V [%] | Fresh | Aged |
|---|---|---|---|---|---|
| 1 | Y | 3.7 | 2.1 | 62 | 28 |
| 2 | La | 4.6 | 1.7 | 68 | 22 |
| 3 | Ce | 4.6 | 1.7 | 62 | 17 |
| 4 | Pr | 4.6 | 1.7 | 60 | 28 |
| 5 | Nd | 4.7 | 1.7 | 66 | 24 |
| 6 | Sm | 4.8 | 1.6 | 64 | 28 |

TABLE 4-continued

Surface area of fresh and aged catalysts prepared according to process I containing RE and V on TiO2:WO3:SiO2 (81:9:10) matrix

| Example Nr. | RE | RE [%] | V [%] | Surface area Fresh | Surface area Aged |
|---|---|---|---|---|---|
| 7 | Gd | 4.9 | 1.6 | 64 | 28 |
| 8 | Tb | 1.4 | 0.5 | 80 | 56 |
| 9 | Tb | 2.8 | 0.9 | 76 | 45 |
| 10 | Tb | 4.9 | 1.6 | 67 | 35 |
| 11 | Dy | 4.9 | 1.5 | 68 | 19 |
| 12 | Er | 1.5 | 0.4 | — | — |
| 13 | Er | 5.0 | 1.5 | 68 | 33 |
| 14 | Yb | 5.1 | 1.5 | 70 | 11 |

TABLE 5

Surface area of fresh and aged V containing catalysts on TiO2:WO3:SiO2 (81:9:10) and TiO2/WO3 (90:10) matrix

| Sample | Surface area Fresh | Surface area Aged |
|---|---|---|
| $V_2O_5$ on Ti/W/Si (81:9:10) | 65 | 8 |
| Ti/W/Si (81:9:10) | 88 | 70 |
| $V_2O_5$ on Ti/W/(90:10) | 24 | 6 |
| Ti/W (90:10) | 59 | 29 |

TABLE 6

Identification of phases with XRD on samples prepared according to process I (4.6 ÷ 5% RE loading) calcined at different temperatures

| dopant | support | Aging at 650° C. $REVO_4$ | Aging at 650° C. Rutile | Aging at 650° C. $WO_3$ | Aging at 750° C. $REVO_4$ | Aging at 750° C. Rutile | Aging at 750° C. $WO_3$ |
|---|---|---|---|---|---|---|---|
| Y | WTS | v. weak | none | none | yes | none | none |
| La | WTS | none | none | none | weak | none | v. weak |
| Ce | WTS | v. weak | none | none | yes | none | Yes |
| Pr | WTS | v. weak | none | v. weak | yes | none | Yes |
| Nd | WTS | v. weak | none | none | yes | none | v. weak |
| Sm | WTS | none | none | none | yes | none | v. weak |
| Gd | WTS | v. weak | none | none | yes | none | v. weak |
| Tb | WTS | none | none | none | yes | v. weak | Yes |
| Dy | WTS | v. weak | none | none | yes | none | weak |
| Er | WTS | v. weak | none | none | yes | none | none |
| Yb | WTS | v. weak | none | none | yes | none | weak |
| Ce | WT | none | none | none | yes | yes | yes |
| Pr | WT | none | none | none | yes | yes | yes |
| Tb | WT | none | none | none | yes | yes | yes |
| Er | WT | none | none | none | yes | yes | yes |

REFERENCES

1. V. I. Parvulescu, P. Grange, B. Delmon, Cat. Today 46 (1998) 233.
2. P. Forzatti, Appl. Catal. A: General 222 (2001) 221
3. S. E. Park, G. M. Kim, Y. J. Lee, J. S. Chang, S. H. Han, U.S. Pat. No. 5,879,645 (1999).
4. P. S. Ji, H. M. Eum, J. B. Lee, D. H. Kim, I. Y. Lee, I. S. Nam, S. W. Ham, S. T. Choo, U.S. Pat. No. 6,380,128 (2002)
5. G. Madia, M. Elsener, M. Koebel, F. Raimondi, A. Woukan, Applied catalysis B: Environmental 39 (2002) 181.
6. M. Koebel, M. Elsener, M. Kleeman, Catal. Today 59 (2000) 335.
7. A. Inoue, T. Suzuki, K. Saito, Y. Aoki, T. Ono, T. Ohara, U.S. Pat. No. 4,221,760 (1980).
8. A. Schafer-Sindlinger, A. Burkardt, H. Van der Tillaart, T. Kreuzer, E. Lox, W. Weisweller, Eu Patent Application EP 1 145762 A1
9. GB. Patent. 1495396 (1974); Mitsubishi Petrochemical Co. Ltd.
10. R. Y. Saleh, I. E. Wachs, S. S. Chan, C. C. Chersich, J. Catalysis 98 1(986) 102.
11. I. Nova, L. dall'Acqua, L. Lietti, E. Giamello, P. Forzatti, Applied Catalysis B: Environmental 35 (2001) 31.

What is claimed is:

1. A process for the preparation of a catalyst composition usable for selective catalytic reduction of exhaust gases, comprising:
   providing a solid support comprising $TiO_2$ in an amount of at least 70 wt. %, $WO_3$ in an amount of 5-20 wt. %, and optionally $SiO_2$ in an amount of up to 15 wt. %;
   contacting the solid support with a vanadate ($REVO_4$) of at least one rare earth metal (RE) selected from the group consisting of Y, Ce, Pr, Nd, Sm, Gd, Tb, Dy, Er and Yb to form a slurry comprising the solid support and vanadate ($REVO_4$);
   drying the slurry to form a dried powder; and
   calcining the dried powder to yield a calcined powder comprising the catalyst composition usable for selective catalytic reduction of exhaust gases.

2. A catalyst composition obtainable according to the process of claim 1, wherein the catalyst composition is a selective catalytic reduction catalyst.

3. A process for the preparation of a catalyst composition as in claim 1, wherein the solid support includes $SiO_2$ in an amount of up to 15 wt. %.

4. A catalyst composition obtained from the process of claim 1, wherein the solid support includes $SiO_2$ in an amount of up to 15 wt. %.

5. A catalyst composition obtained according to the process of claim 1.

6. A process for the preparation of a catalyst composition as in claim 1, wherein the process yields a selective catalytic reduction catalyst.

7. A catalyst composition as in claim 2, wherein the catalyst composition is a selective catalytic reduction catalyst.

8. A process for the preparation of a catalyst composition as in claim 3, wherein the process yields a selective catalytic reduction catalyst.

9. A catalyst composition as in claim 4, wherein the catalyst composition is a selective catalytic reduction catalyst.

10. A catalyst composition as in claim 5, wherein the catalyst composition is a selective catalytic reduction catalyst.

11. A process for the preparation of a catalyst composition as in claim 1, wherein the rare earth metal (RE) is selected from the group consisting of Pr, Sm, Gd, Tb, Dy and Er.

12. A process for the preparation of a catalyst composition as in claim 1, wherein the rare earth metal (RE) is selected from the group consisting of Sm, Gd, Tb, Dy and Er.

13. A process for the preparation of a catalyst composition as in claim 1, wherein the rare earth metal (RE) is selected from the group consisting of Tb and Er.

14. A process for the preparation of a catalyst composition usable for selective catalytic reduction of exhaust gases, comprising:
   providing a solid support comprising $TiO_2$ in an amount of at least 70 wt. %, $WO_3$ in an amount of 5-20 wt. %, and optionally $SiO_2$ in an amount of up to 15 wt. %;
   contacting the solid support with a vanadate ($REVO_4$) of at least one rare earth metal (RE) selected from the group consisting of Pr, Sm, Gd, Tb, Dy, and Er to form a slurry comprising the solid support and vanadate ($REVO_4$); and drying and calcining the slurry to yield the catalyst composition usable for selective catalytic reduction of exhaust gases.

15. A process for the preparation of a catalyst composition as in claim 14, wherein the rare earth metal (RE) is selected from the group consisting of Sm, Gd, Tb, Dy, and Er.

16. A process for the preparation of a catalyst composition as in claim 14, wherein the rare earth metal (RE) is selected from the group consisting of Tb and Er.

17. A catalyst composition obtained according to the process of claim 14.

18. A catalyst composition obtained according to the process of claim 15.

19. A catalyst composition obtained according to the process of claim 16.

* * * * *

UNITED STATES PATENT AND TRADEMARK OFFICE
CERTIFICATE OF CORRECTION

| | |
|---|---|
| PATENT NO. | : 8,716,172 B2 |
| APPLICATION NO. | : 10/595795 |
| DATED | : May 6, 2014 |
| INVENTOR(S) | : Schermanz et al. |

It is certified that error appears in the above-identified patent and that said Letters Patent is hereby corrected as shown below:

In the Specification

Column 4
Line 55, change "Erbitunbydroxide" to --Erbiumhydroxide--

Signed and Sealed this
Thirty-first Day of March, 2015

Michelle K. Lee
*Director of the United States Patent and Trademark Office*